Nov. 15, 1932.  F. S. SWANEY  1,888,098
THERMOSTATIC CONTROL FOR ROLLING MILLS
Filed Jan. 16, 1930   2 Sheets-Sheet 1
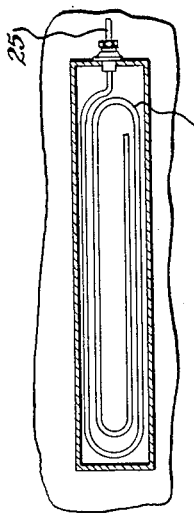
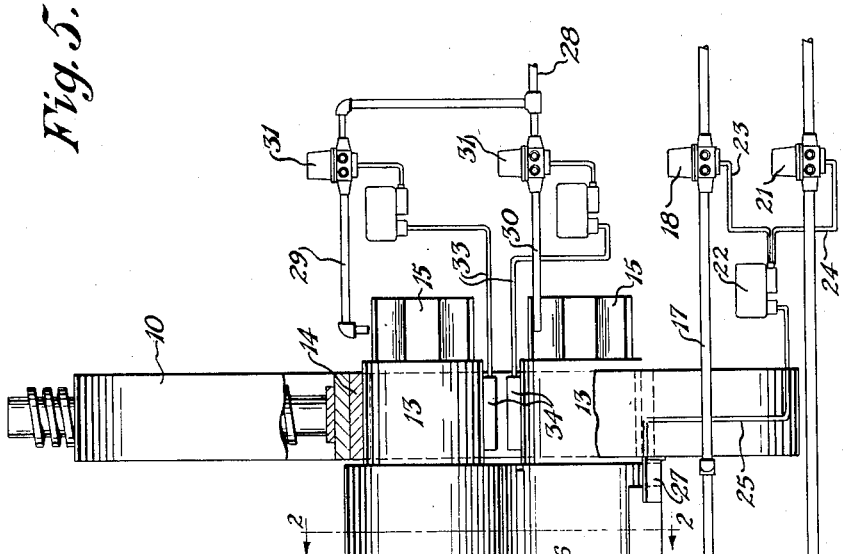
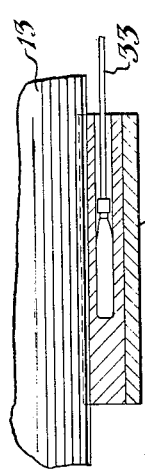
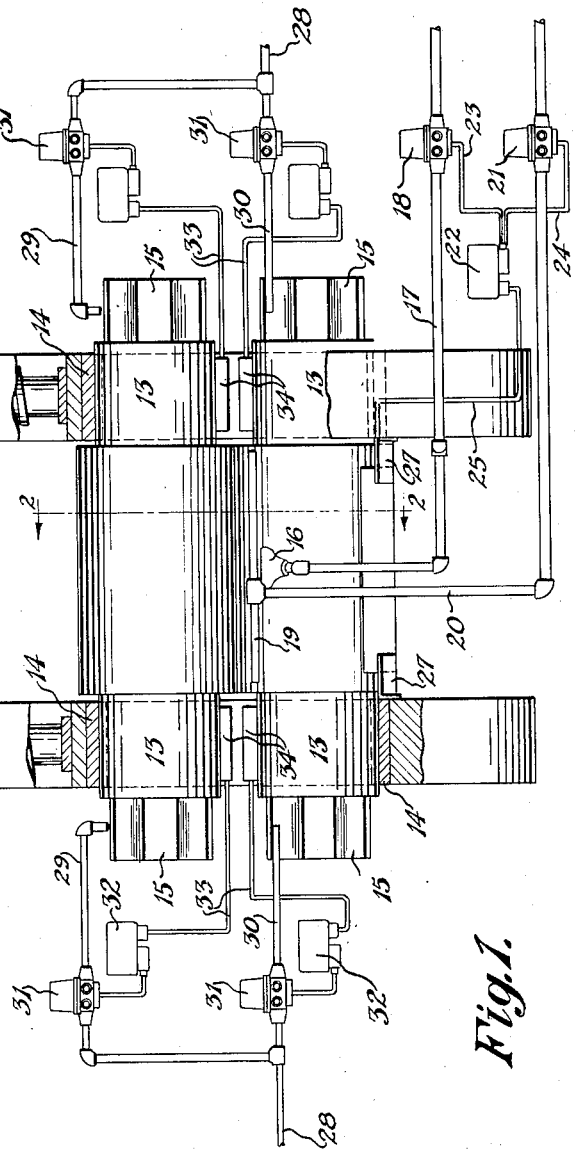
Inventor
*F. S. Swaney*
By *Harry Frease*
Attorney Nov. 15, 1932.  F. S. SWANEY  1,888,098
THERMOSTATIC CONTROL FOR ROLLING MILLS
Filed Jan. 16, 1930   2 Sheets-Sheet 2
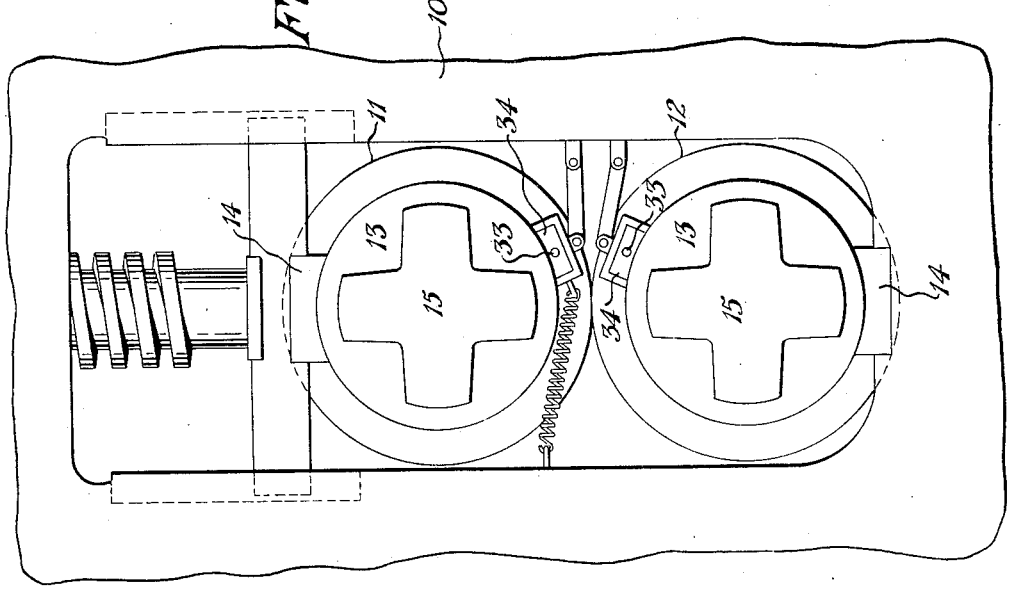
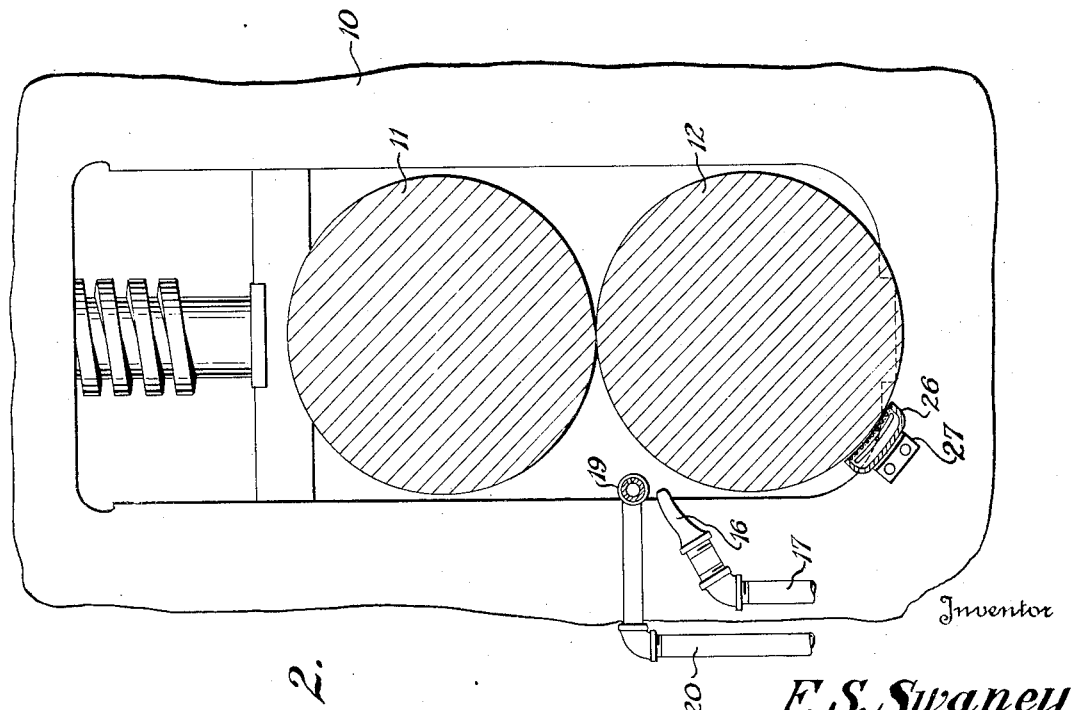
Inventor
F. S. Swaney
By Harry Frease
Attorney Patented Nov. 15, 1932

1,888,098

UNITED STATES PATENT OFFICE

FRANK S. SWANEY, OF MASSILLON, OHIO

THERMOSTATIC CONTROL FOR ROLLING MILLS

Application filed January 16, 1930. Serial No. 421,238.

The invention relates to rolling mills, and more particularly to automatic means for thermostatically controlling the temperature of the rolls.

The object of the improvement is to provide heating and cooling means for the rolls with thermostatically operated means for applying either a heating or cooling agent to the rolls to maintain them at substantially a uniform temperature.

The above and other objects may be attained by providing steam and gas lines to the rolls, solenoid valves being provided in both the steam and gas lines and both operated by a thermostat controlled by the temperature of the rolls whereby as the rolls cool below the desired temperature, the steam valve may be closed and the gas valve opened or vice versa.

For the purpose of cooling the necks of the rolls, water may be applied thereto, solenoid valves being provided in the water line and operated by a thermostat controlled by the temperatures of the necks.

The above and other objects may be attained by constructing the improved device in the manner illustrated in the accompanying drawings, in which Figure 1 is a front elevation of a rolling mill showing the invention applied thereto, parts being broken away for the purpose of illustration;

Fig. 2, an enlarged sectional view taken substantially on the line 2—2, Fig. 1;

Fig. 3, an enlarged end elevation showing the thermostatically controlled cooling means for the neck of the rolls;

Fig. 4, an enlarged detail sectional view of the thermostatic bulb such as used upon the necks of the rolls; and Fig. 5, a similar view of the thermostatic bulb used upon the rolls.

Similar numerals refer to similar parts throughout the drawings.

The housings of a conventional rolling mill are shown at 10, having journaled therein the upper and lower rolls 11 and 12 respectively, each roll being provided at opposite ends with the necks 13 mounted in the customary brasses 14 provided in the housings, and having the usual wabblers 15 at their ends.

In the operation of rolling mills it is necessary, in order to produce a product of desired quality, to keep the temperature of the rolls within certain limits. Under ordinary practice this is done entirely by guesswork, the roller having to judge by experience as to the temperature of his rolls and manually operating either a gas or steam line in an effort to raise or lower the temperature of the rolls as required.

This practice does not permit of the best results in metal sheets and the like which are being rolled as it is not ordinarily possible to maintain the temperature of the rolls within a hundred degrees Fahrenheit of the ideal temperature required for the work.

The present invention contemplates the provision of means for thermostatically controlling the temperature of the rolls by automatically applying either a heating or cooling agent directly to the outer working surfaces of the rolls as required by the actual temperature of the working surfaces themselves; and further contemplates similar means for applying a cooling agent to the necks of the rolls in order to prevent undue overheating of the same.

For the purpose of heating the rolls, a gas burner 16 is located adjacent to the rolls and in position to direct a flame substantially into the pinch of the rolls, this burner being connected to the gas supply pipe 17 having therein a solenoid valve 18.

For the purpose of applying a cooling agent to the rolls, a steam nozzle 19 may be located adjacent to the gas burner and adapted to direct jets of steam into the pinch of the rolls, this nozzle being mounted upon a steam pipe 20 having located therein a solenoid valve 21, which may be similar to the gas valve 18.

A dual control is arranged for the valves 18 and 21 whereby as one valve is opened the other is closed. This may be accomplished by a thermostat as indicated generally at 22, or a contacting pyrometer or the like electrically connected to the valves 18 and 21 as by the conductors 23 and 24 respectively, and arranged to be operated by the temperature of the rolls as through the tube 25 connected to a bulb 26, thermocouple or the like.

This bulb or thermocouple may be held in contact with the lower roll 12 as by the brackets 27, supported upon the housings. Although the contact may be made with either roll, for the purpose of convenience in operation of the mill, it is preferable to locate the same beneath the lower roll, as illustrated.

Thus as the temperature of the outer surfaces of the rolls increases beyond the desired limit, the thermostat or pyrometer will be immediately operated to close the gas valve 18 and open the steam valve 21, tending to cool the outer surfaces of the rolls and as they reach the lower limit of temperature, the steam valve is automatically closed and the gas valve again opened. It should be understood that a pilot light may be provided upon the gas burner to permit of the turning on and off of the burner during the operation of the device.

For the purpose of cooling the necks of the rolls, a water supply pipe 28 may be provided at each end of the mill with branch pipes 29 and 30 adapted to spray water upon the wabblers or necks of the upper and lower rolls respectively.

A solenoid valve 31 is located in each water line 29 and 30 and controlled by a thermostat or pyrometer 32, connected, as by a tube 33, with a bulb or thermocouple 34 contacting with each neck 13.

Thus it will be seen that each of the valves 31 is thermostatically controlled by the temperature of the corresponding neck 13 and as the temperature of the neck increases, the valve is automatically opened to a greater extent in order to maintain the neck at the proper temperature.

From the above it will be seen that a uniform temperature of rolls may be maintained, eliminating the possibility of overheating or underheating the rolls as is common in ordinary practice where it is necessary for the roller to guess at the temperature of his rolls and to either heat or cool the rolls manually as he considers the same necessary.

I claim:

1. In combination with a rolling mill for rolling metal and having solid rolls therein, means for applying a heating agent externally to the longitudinally central portion of the rolls, a valve controlling the heating means, means for applying a cooling agent externally to the longitudinally central portion of the rolls, a valve controlling the cooling means, thermostatic means controlling the valves, a thermal bulb operating the thermostatic means, and means holding the thermal bulb in contact with the outer surface of one of the rolls.

2. In combination with a rolling mill for rolling metal and having solid rolls therein, means for applying a heating medium to the outer working surfaces of the rolls, means for applying a cooling medium to the outer working surfaces of the rolls, and means controlled by the temperature of the outer working surfaces of the rolls for operating the means for applying heating and cooling mediums.

3. In combination with a rolling mill for rolling metal and having solid rolls therein, means controlled by the temperature of the outer working surfaces of the rolls for applying a heating agent to said working surfaces when the temperature of the working surfaces drops to a predetermined temperature, and for applying a cooling agent to the outer surfaces when their temperature rises to a predetermined temperature.

4. In combination with a rolling mill for rolling metal and having solid rolls therein, means for applying a heating medium to the outer working surfaces of the rolls, a valve controlling said heating means, means for applying a cooling medium to the outer working surfaces of the rolls, a valve controlling said cooling means, a thermostat controlling the valves, and a thermal bulb operated by the temperature of the outer working surfaces of the rolls and controlling the thermostat.

5. In combination with a rolling mill for rolling metal and having solid rolls therein, means for applying a heating medium to the outer working surfaces of the rolls, a valve controlling said heating means, means for applying a cooling medium to the outer working surfaces of the rolls, a valve controlling said cooling means, and a thermostat controlled by the temperature of the outer working surfaces of the rolls for controlling the valves.

6. In combination with a rolling mill for rolling metal and having solid rolls provided with a neck at each end, cooling means for the outer working surfaces of the rolls, cooling means for each of the necks, and means controlled by the temperature of the respective necks for operating the several neck cooling means.

7. In combination with a rolling mill for rolling metal and having solid rolls therein, means for applying a cooling medium to the outer working surfaces of the rolls, and means controlled by the temperature of the outer working surfaces of the rolls for operating the means for applying the cooling medium.

8. In combination with a rolling mill for rolling metal and having solid rolls therein, means for applying a heating medium to the outer working surfaces of the rolls, and means controlled by the temperature of the outer working surfaces of the rolls for operating the means for applying the heating medium.

9. In combination with a rolling mill for rolling metal and having solid rolls provided with a neck at each end, cooling means for each of the necks, and means controlled by the temperature of the respective necks for operating the several neck cooling means.

In testimony that I claim the above, I have hereunto subscribed my name.

FRANK S. SWANEY.